Dec. 30, 1930. K. DAVIS 1,787,340
MECHANISM AND PROCESS FOR SEPARATING INTERMIXED DIVIDED MATERIALS
Filed July 10, 1922 6 Sheets-Sheet 1
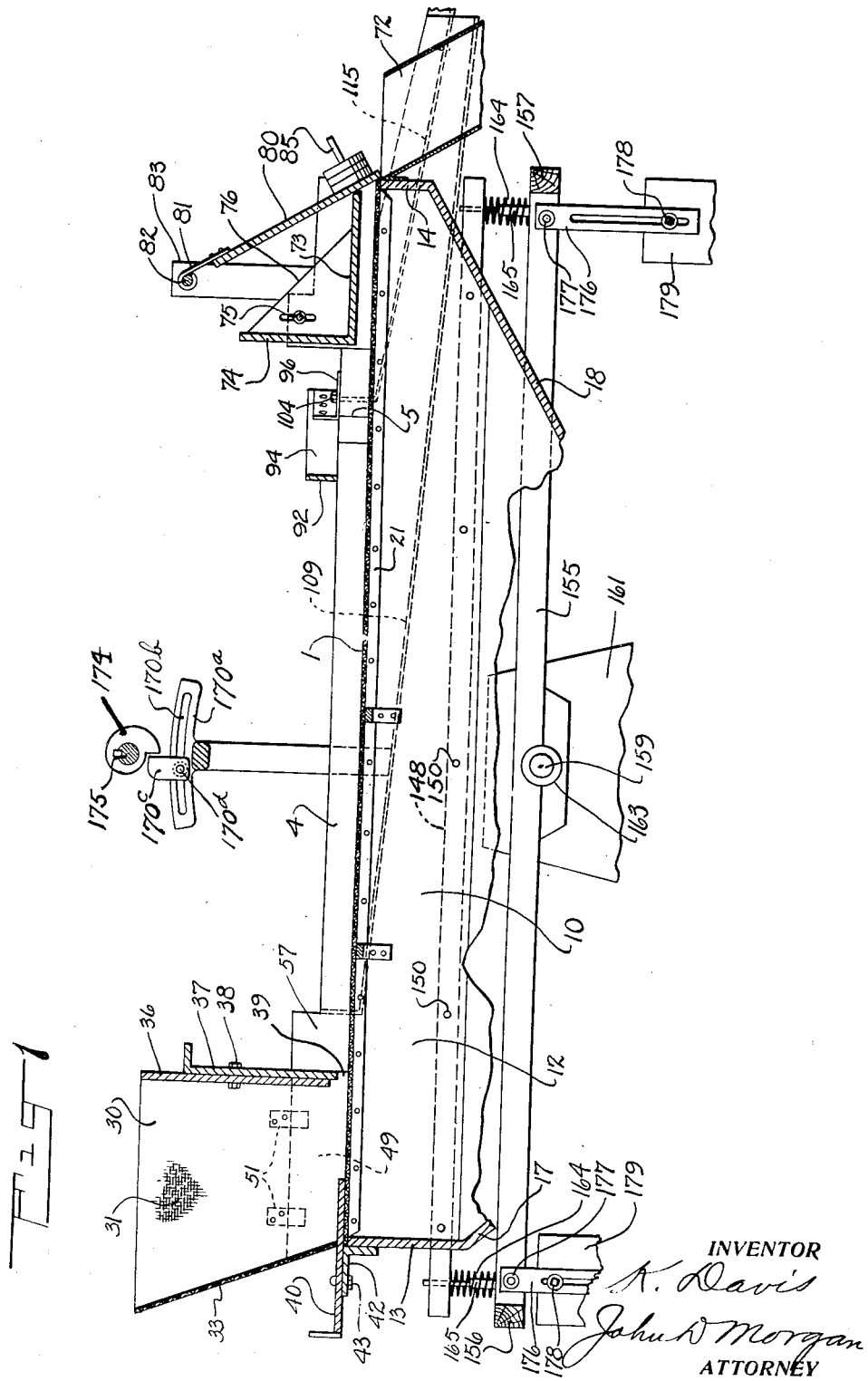
INVENTOR
K. Davis
John D Morgan
ATTORNEY

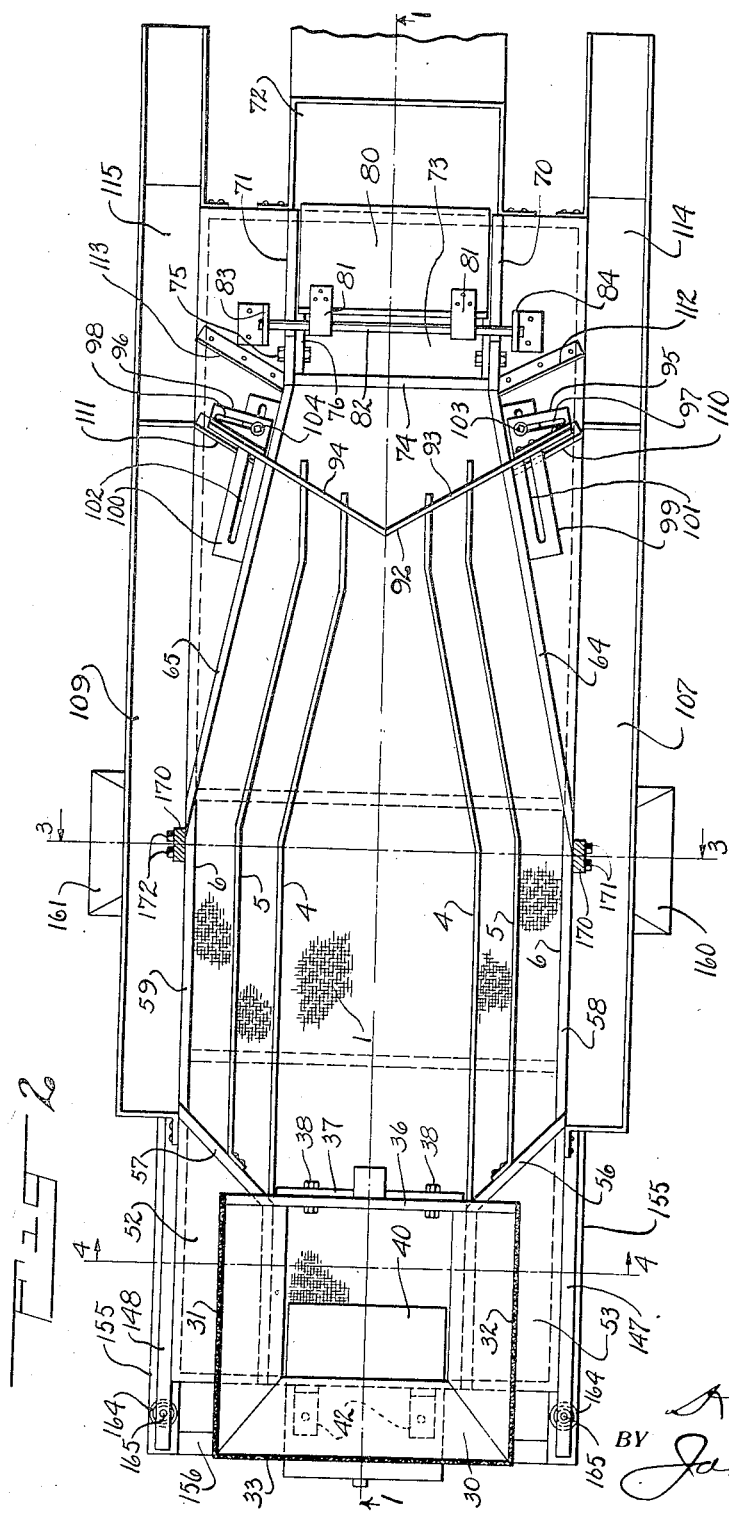

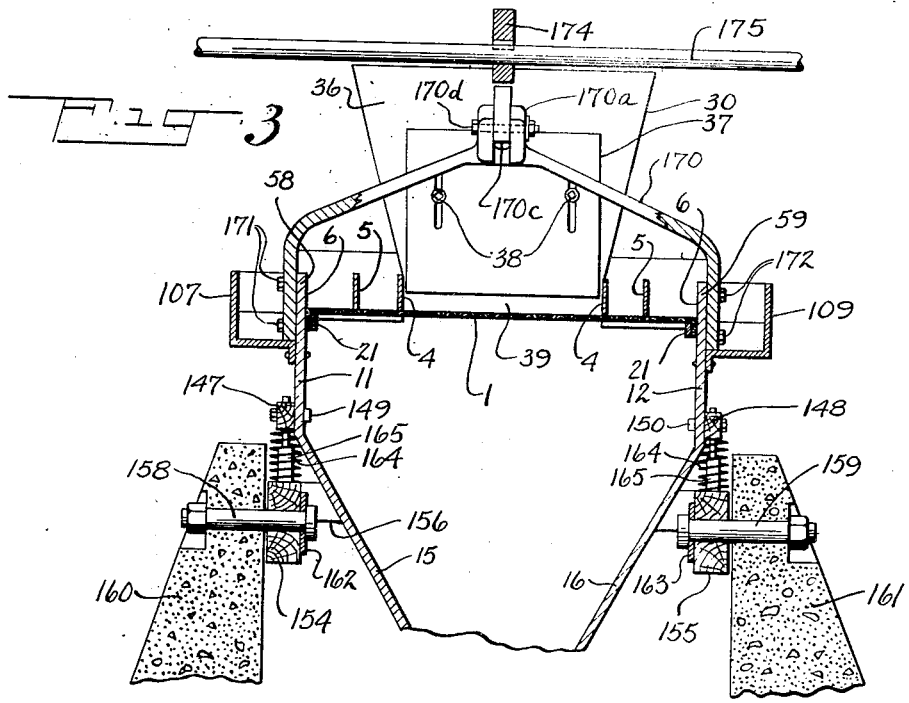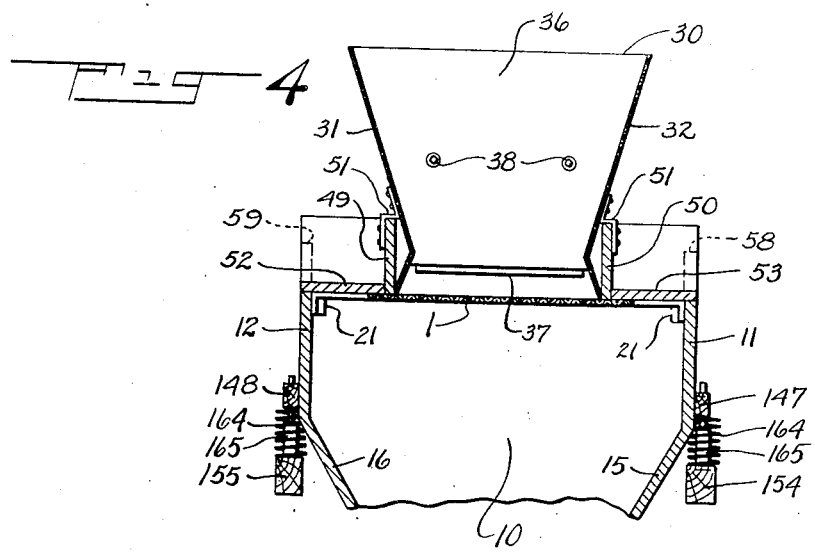

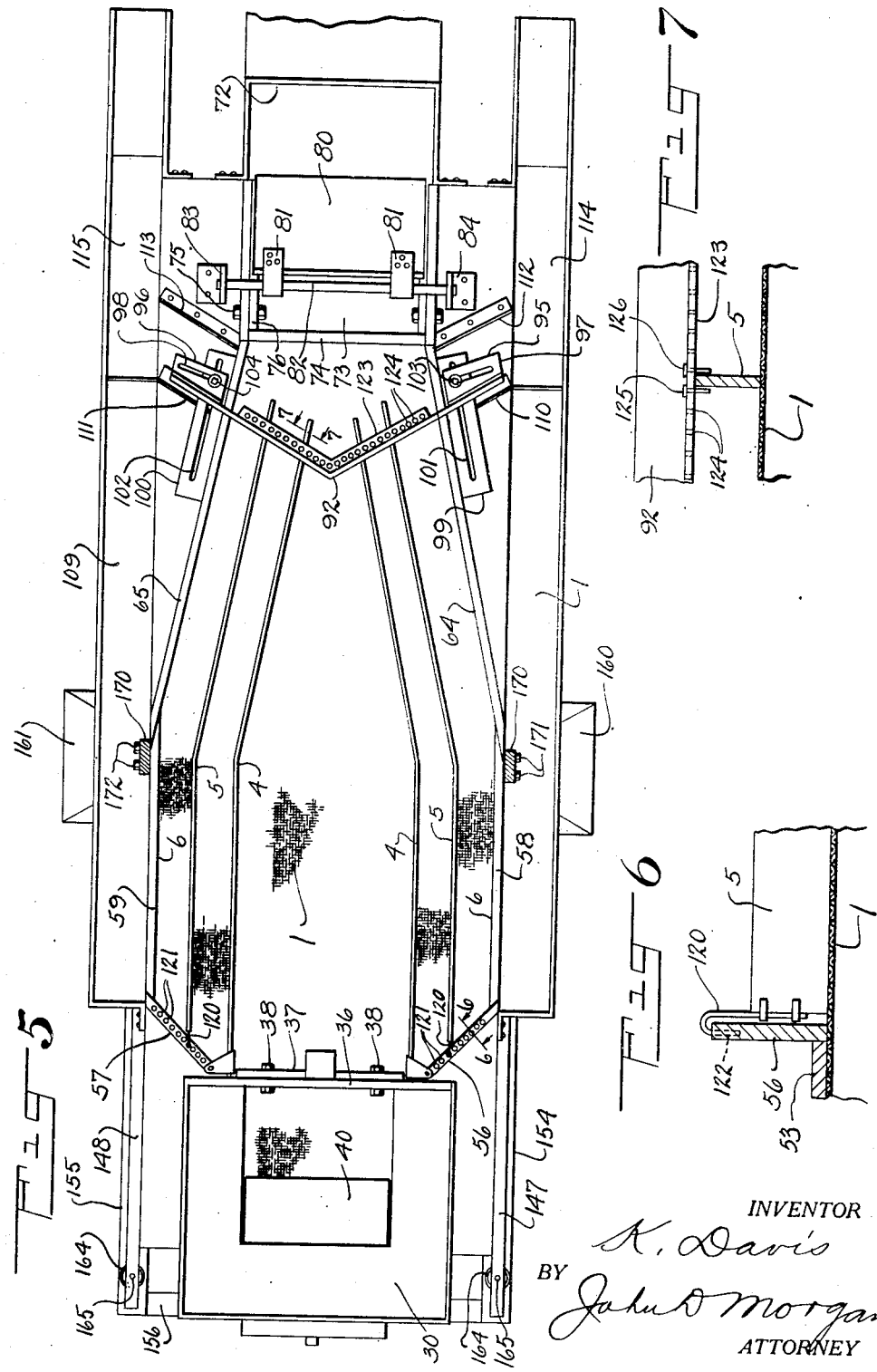

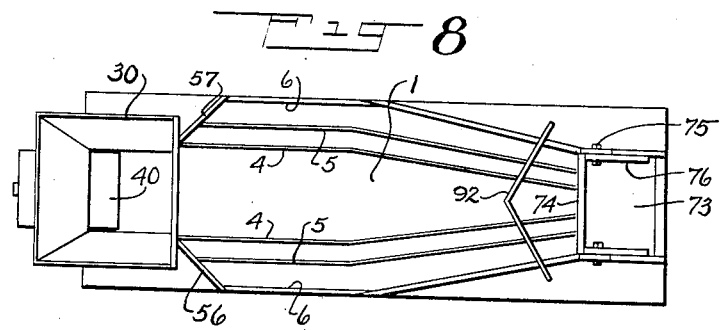

Dec. 30, 1930.  K. DAVIS  1,787,340
MECHANISM AND PROCESS FOR SEPARATING INTERMIXED DIVIDED MATERIALS
Filed July 10, 1922   6 Sheets-Sheet 6
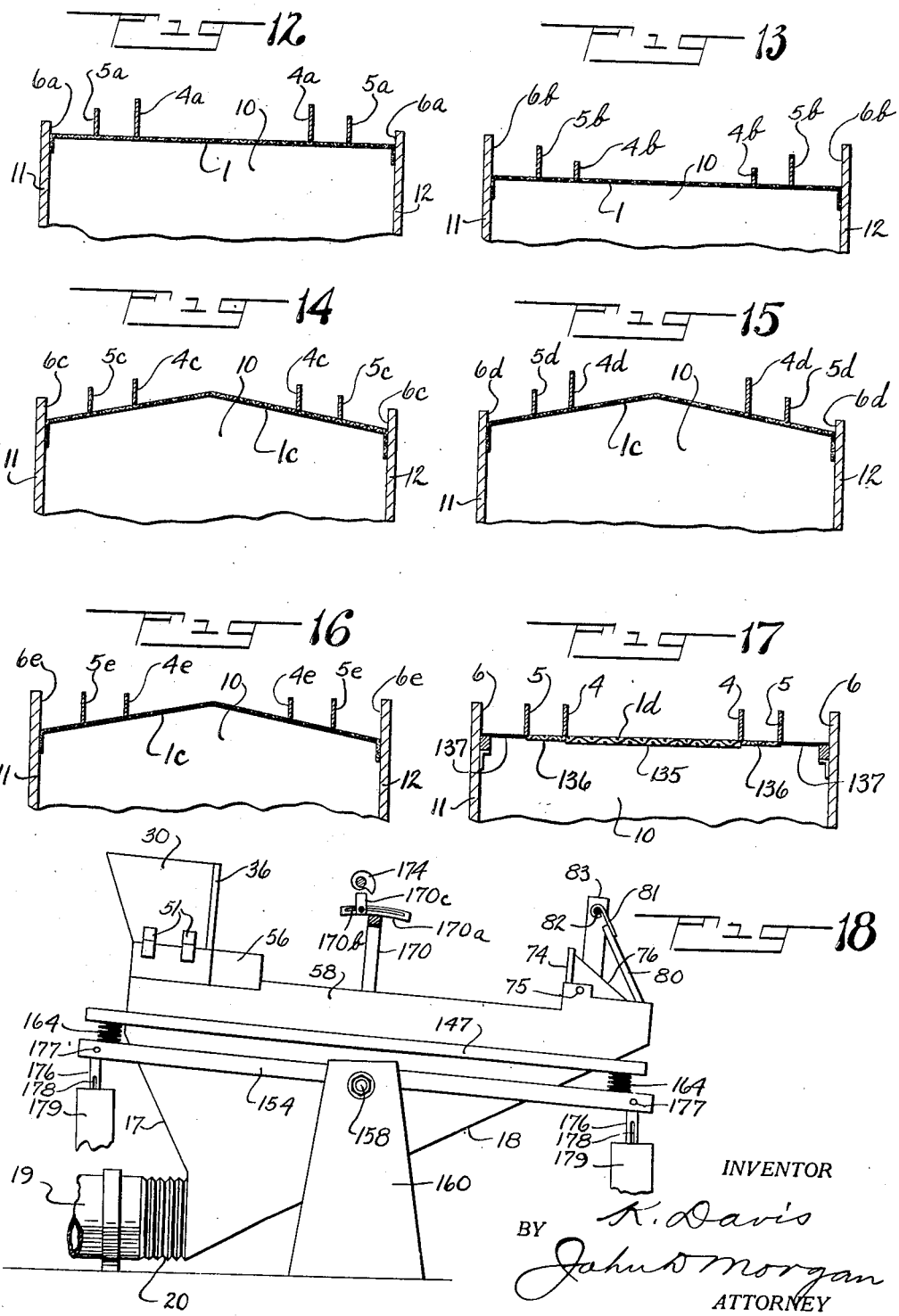
INVENTOR
K. Davis
BY John D Morgan
ATTORNEY Patented Dec. 30, 1930

1,787,340

UNITED STATES PATENT OFFICE

KENNETH DAVIS, OF ST. BENEDICT, PENNSYLVANIA, ASSIGNOR, BY MESNE ASSIGNMENTS, TO PEALE-DAVIS COMPANY, OF WILMINGTON, DELAWARE, A CORPORATION OF DELAWARE

MECHANISM AND PROCESS FOR SEPARATING INTERMIXED DIVIDED MATERIALS

Application filed July 10, 1922. Serial No. 574,033.

The invention relates to a novel mechanism for separating intermixed divided materials and in certain aspects thereof more especially to such mechanism particularly adapted to separating intermixed coal and rock and like materials.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a vertical longitudinal section taken substantially on the line 1—1 of Fig. 2;

Fig. 2 is a full top plan corresponding to Fig. 1;

Fig. 3 is a vertical transverse section taken on the line 3—3 of Fig. 2, looking in the direction of the arrows;

Fig. 4 is a vertical transverse section taken on the line 4—4 of Fig. 2, looking in the direction of the arrows;

Fig. 5 is a view corresponding to Fig. 2, showing certain modifications in the structure, and especially the variably positionable separating partitions or side walls;

Fig. 6 is a detached detail, partly in vertical section and partly in elevation, greatly enlarged, on the line 6—6 of Fig. 5;

Fig. 7 is a detached detail, greatly enlarged, with parts in elevation and parts in section, on the line 7—7 of Fig. 5;

Fig. 8 is a greatly diminished top plan showing a modified construction of the side walls or separating partitions;

Fig. 9 is a side elevation corresponding to Fig. 8, and showing certain modifications;

Fig. 10 is a fragmentary vertical longitudinal section, corresponding to the right-hand end of Fig. 1, but showing a somewhat different construction;

Fig. 11 is a view of substantially the same parts as Fig. 10, but showing a still different construction;

Figs. 12 to 17 are fragmentary transverse vertical sections of a separating unit, showing different structures and modifications, particularly adapted for use with different kinds of materials and with materials in different physicial states; and Fig. 18 is a side elevation, greatly reduced, looking at the mechanism of Fig. 1 from the front and at Fig. 2 from the right-hand side of the sheet.

The invention, especially in the present preferred embodiment, exemplarily illustrated in the accompanying drawings, is particularly capacitated for rapidly, easily and efficaciously separating intermixed divided materials, and is capacitated especially for such service with intermixed divided materials, the intermixed fragments or particles of which vary in size through a wide range of sizes, and is also adapted to operate on such materials in different physical states or conditions.

So far as concerns the feature of rapidly, successively and efficiently handling the intermixed divided materials in such wide range of sizes, and having especially in mind the separation of intermixed coal and rock, and frequently of an intermixture of "bone" therewith, the machine of the present invention effects a substantially complete or perfect separation through a wide range of sizes, many times that of ordinary separators. This obviates the usual troublesome, expensive and time-consuming preliminary "sizing", which is necessary with the separators now in use, in order to supply a separating machine with the intermixed materials of uniform size within a very small range of sizes.

Most separators require preliminary "sizing" of the intermixed materials within a range of one-sixteenth of an inch in smaller sizes. The machine of the present invention will handle efficiently, and produce perfect results on, the intermixed materials through a range of sizes varying by one inch, and with certain materials and under certain conditions by one and one-half inches. Certain features of the present invention relate also to positional and other regulations in the machine for securing the results indicated with the materials differing in the manner described.

The term "divided" as used herein signifies material in relatively small fragments, parts or particles as differentiated from material in relatively large parts or masses, and such material may be broken, granular, comminuted, pulverulent or otherwise.

In its main features, the invention comprises a relatively wide, long and shallow body or unit within which is contained a bed of the intermixed materials, fed thereto at a rate corresponding to the separating capacity of the unit. The intermixed materials in the bed are rapidly stratified and thereby separated, this result being effected conjointly by air currents forced upwardly through the bed of materials, and by the motion of the unit, and by the shape and position of the unit and of its parts, the separated and stratified materials being discharged from the mechanism at different points.

The invention provides, as one of its features, and preferably in conjunction with the general construction of unit already described, for a recurrence or perpetuation of the separating action, that is, a re-subjection to the separating action of an intermixed remainder of the materials after a part, and usually the greater part has been separated. This acts to completely separate the two or three intermixed materials, despite the wide variation in sizes of the particles of the intermixed materials, as already described. This is effected in the present preferred embodiment by a series of "separating partitions" as later described in detail.

The invention in certain of its features is especially designed for rapid, efficient and practically complete or perfect separation of intermixed coal, rock or slate and "bone" or "bony", the latter being a substance which while combustible has low heat value and a very high ash content. In this particular instance of intermixed coal, rock and "bone" it will be understood that the "bone" is of intermediate specific gravity between the coal and rock.

Referring now in detail to the present preferred embodiment of the invention, the unit is shown provided with an air pervious bottom 1, preferably constructed of close wire mesh, although other air pervious material or structures may be used. The unit is provided, preferably at either side, with a plurality of longitudinally-disposed, spaced-apart side walls, shown as three in number, 4, 5 and 6, which I prefer to call separating partitions, as they participate in the repetitions or recurrence of the stratifying and separating action on any possible intermixed remainder after the main separating action is completed. There is thus formed a central stratifying area of substantial size at the center of the bed.

These partitions or walls rest upon and project upwardly from the air pervious bottom 1, and extend along the unit, in parallel or non-parallel inter-relation. In the present preferred form, they extend from the rear substantially parallel with the axis of the unit and then converge inwardly toward the center or axis of the unit, as best appears from Fig. 2.

In the embodied form of means for forcing the air upwardly through the air-pervious bottom 1, there is formed underneath the bottom an air chamber 10, having the upper part of its side walls 11 and 12 disposed substantially vertically and the upper part of its end walls 13 and 14 similarly disposed. The lower parts 15 and 16 of the respective side walls, and the lower parts 17 and 18 of the end walls, converge toward a supply pipe 19, through which air under pressure is supplied from any suitable source such as a blower, compressor or the like. A suitable pressure-regulating valve may be provided, if desired. The pipe 19 preferably has an expansible and contractible portion 20, to permit of the motion of the separating unit. The bottom 1 of the unit is supported by, and fastened to, the walls of the air chamber by means of strips 21, as shown in Figs. 1 and 3.

Means are provided for supplying the intermixed divided materials to the unit at such rate and in such quantity as is suitable for the separating capacity of the unit. In the embodied form of such means, a hopper 30 is provided at the material-supplying end of the unit, which may conveniently be styled the rear end thereof. This hopper is shown with side walls 31 and 32 and a rear wall 33, preferably of air pervious materials, such as the wire mesh, which facilitates cleaning the material in the hopper as later explained.

These walls are inclined inwardly and downwardly to a short distance from the bottom and then are inclined downwardly and outwardly, as best appears from Fig. 4. In this lower part at the forward side is the discharge or feeding opening or port 39 from the hopper into the body of the unit. This construction prevents choking and jamming of the material in the bottom part of the hopper.

The front wall of the hopper is preferably formed as a solid plate or board 36, conveniently vertically arranged, and mounted thereon is a device for varying or regulating the flow or supply of the intermixed materials to the body of the unit. As embodied, a slide 37 is mounted upon the forward or external face of the side 36, by bolt and slot connection 38. The slide extends across the width of the hopper and is projectable into and withdrawable from the port 39, thereby constituting means for varying the size of the opening or port 39 from the hopper into the rear end of the separating unit.

The hopper as so constructed may be utilized for cleaning out dust from the intermixed materials by directing a regulated quantity of the air current upwardly through the hopper to blow out the dust, the air-pervious floor 1 extending back beneath the hopper. As embodied, means are provided for regulating the air current flow upwardly through the hopper. For this purpose, a slidable plate 40 rests upon the rear end of the bottom 1, and extends across the width of the hopper. The plate 40 is slidably supported on a bracket 42, fastened to the rear end of the air chamber, there being a bolt and slot connection 43 between the plate and its supporting bracket. Thus the plate may be slid inwardly and outwardly to regulate the air current upwardly through the hopper.

Referring now to the present preferred structure of the separating partitions or walls 4, 5 and 6, the hopper is preferably of less width than the body of the separating unit (see especially Figs. 2, 3 and 4). In this construction, the hopper is supported upon vertically disposed plates or boards 49 and 50, by means of a series of brackets 51, fastened to the sides of the hopper and resting upon the top edges of the plates 49 and 50, and extending downwardly along and fastened to the sides thereof. Outside of these vertically-disposed boards or plates 49 and 50 are horizontally-arranged boards or plates 52 and 53, constituting an air-tight top closure for the air chamber outside of the air pervious bottom, as best appears in Fig. 4. The air pervious bottom 1 of the unit is correspondingly narrower at this part.

Just forwardly of the hopper and of the place of delivery of the intermixed materials into the body of the unit, the air pervious bottom 1 is extended outwardly for the full width of the unit. At the same places, and constituting a continuation of the plates or boards 49 and 50, are vertically disposed, outwardly and forwardly inclined boards or plates 56 and 57, at either side, extending from the plates 49 and 50, respectively, to the outer edges of the unit. The members 56 and 57 join the external side walls 58 and 59 of the unit, which may conveniently be integral upward extensions of the side walls 11 and 12 of the air chamber, as shown in Fig. 3. These side walls 58 and 59 are a part of the "separating partitions" 6 already described, these numerals being used merely for convenience in describing the details of the present embodied structure.

According to certain features of the invention, the side walls and separating partitions of the unit may be varied in form and in position as well. In the preferred present embodiment, these walls extend substantially parallel to the longitudinal axis of the unit and to each other along the rear part of the unit, but at or near the central part thereof, they converge inwardly toward each other and toward the forward end of the unit. Thereby the unit and the separating partitions are of less width toward the forward end thereof and converge transversely to the direction of impulsion of the heavier material.

As shown, therefore, the side walls 58 and 59 extend parallel from in front of the hopper toward the approximate central part of the unit, and continuations 64 and 65 thereof converge forwardly and inwardly and toward each other, as best seen in Fig. 2. This acts to increase the discharging action of the stratified and separated materials and increases the capacity of the unit.

In accordance with certain of the main features of the invention there is, as already stated, a plurality of separating partitions or walls at either side of the unit, and these are preferably of the same general form and similarly disposed to the outer side-walls just described, and the latter may in fact also act as separating partitions. As embodied, the separating partitions 4 and 5 are arranged at either side within the external side-walls, resting upon and projecting upwardly from the air pervious bottom 1.

As previously stated, the walls 6, consisting of the parts 58 and 64 on one side and 59 and 65 on the other side, may be regarded as having similar functions although in lesser degree. They are preferably parallel to the external side-walls and to each other, although this may be varied so far as concerns certain features of the invention, and in the handling of different kinds of materials. As embodied, the partitions 4, at their rear ends, abut on and are fastened to walls 56 and 57, respectively, at and close to either side of the port or opening 39 from the hopper into the unit, and extend forwardly along the unit as already described. The port thus discharges the intermixed materials inside these separating partitions.

The partitions 5 at either side abut, respectively, upon, and are fastened to, the walls 56 and 57 intermediately between the corresponding exterior side walls 6 and the partitions 4, already described, and likewise extend forwardly along the unit as also already described. In Figs. 2 and 5 the inner separating partitions 4 and 5 are shown as stopping short of the forward or discharge end of the separating unit, but they may be continued to the forward end thereof, and this is shown in Fig. 8.

Means are provided at the forward end of the unit for discharging the rock or other heavier material, and in connection therewith means for creating an upward and backward air pressure, designed to effect a final separation of any small residue of intermixed materials, as of the coal and rock and "bone". As embodied, the forward end of the unit has the side walls 70 and 71 thereof abutting on, and extending forwardly from, the parts 64 and 65 of the side-walls, consisting of two parallel portions, which terminate at the forward end of the unit and between which the rock or other heavier material is discharged from the unit. A chute 72 may be provided for receiving this discharged material.

In said embodied form, a horizontally-disposed plate 73 extends along and substantially entirely across between the side-walls 70 and 71, and with the bottom 1 and sides 70 and 71 of the unit constituting a passage for the rock. At its rear end there is fixed to plate 73 a vertically-disposed wall or plate 74, likewise extending across between upward extensions of the walls 70 and 71. This air confining and directing device is positionable vertically to and fro between the extensions of the side-walls 70 and 71 by means of bolt and slot connections 75, formed at either side, in the side-walls and in plates or brackets 76 extending between the horizontal wall 73 and the vertical wall 74 at either side thereof.

A gate 80 is preferably provided which closes the discharge opening for the heavier material, but yields to pressure from within the unit. This gate is inclined downwardly and forwardly of the unit, and is pivotally supported by hinges 81 from a horizontally and transversely disposed rod 82, which rod is carried in standards 83 and 84, mounted on the body of the unit. Means may be employed for varying the pressure at which the gate 80 will open, and for this purpose a pin 85 is fixed to, and extends from, the outward side of the gate, upon which a suitable weight or weights may be hung.

In the operation of the mechanism, the air under pressure in the air chamber is forced upwardly through the air pervious bottom 1, and the unit is positioned at a desired inclination by means later to be described, and it is also subjected to a vibratory or other suitable movement as is likewise later described. The intermixed materials thus move forwardly from the hopper through the opening 39 onto the bottom 1 and the greater part thereof is immediately stratified and separated in the central stratifying area of the bed 1. In the case of the materials already mentioned, the rock sinks to the bottom and rests upon the bottom while the coal is carried to the top of the bed, the "bone" being stratified in an intermediate position or level between the coal and the rock.

All the intermixed materials as they enter at the rear end of the unit are within the inner separating partitions 4, and all the larger pieces of rock or other heavier material, and therewith nearly all of this component of the intermixed materials is restrained by the partitions 4 from moving transversely outwardly, and by the motion and vibration of the unit is impelled forwardly and is delivered at the forward end between the walls 4.

On the other hand, the lighter material is suspended or buoyed upwardly by the air current and passes over the partitions 4 transversely, and thus moves outwardly toward the side wall of the unit. This action is increased by the convergence forwardly of the separating partitions. The same action is repeated at the separating partitions 5 and at the separating partitions or side walls 6.

Where the intermixed materials have the different particles or fragments of their components varying relatively widely in size, as already described, the smaller particles of the heavier material may, to a greater or less degree, be carried over the first separating partitions 4. And this may be true also to a greater extent or degree in the case of their being three intermixed materials, such as the coal, "bone" and rock.

The stratifying action is repeated between the separating partitions 4 and 5, the heavier material again sinking to the bottom and being thus restrained from transverse movement, is forced to move forwardly along the unit and be discharged from the forward end thereof. On the other hand, the lighter material is suspended or buoyed upwardly by the air current, and will pass sidewise over the partition.

In Fig. 17 the air pervious bottom is shown of different size mesh for the different separating zones, or otherwise constructed to give different strengths of the separating and stratifying air currents in the different separating zones.

Thus the separating action is repeated with reference to these relatively smaller fragments or particles of the material, and a like action will occur or recur between the separating partitions 5 and 6. Thus, notwithstanding variations in size, the heavier material is forced forwardly along the unit and discharged from the forward end thereof, while the lighter material is discharged over the sides thereof, and the complete separation thereof is insured by the recurrence or repetition of the separating action.

Means are provided for transversely deflecting the top stratum, in addition to the means already described, and for this purpose a deflector 92 is provided. As embodied, it has vertically-disposed plates 93 and 94, inclined outwardly and forwardly from the central part of the unit toward the sides thereof, this deflector preferably resting upon the top edges of the separating partitions 4, 5 and 6.

This deflector is preferably variably positionable to and fro longitudinally of the unit, and with this in view, as embodied, it has fixed to the forward and external ends thereof horizontally-disposed, forwardly-projecting plates 95 and 96, provided with slots 97 and 98. These plates 95 and 96 rest on corresponding plates 99 and 100 fixed on the external sides of the parts 64 and 65 of the side walls of the unit. These plates are likewise provided, respectively, with slots 101 and 102, and bolts 103 and 104 pass through the respective pairs of slots to position the deflector 92 and to fasten it in the desired longitudinal position with respect to the unit.

From the foregoing description of the operation taken in connection with Figs. 1 and 3 of the drawings, it will be clear that a bed of substantial depth is maintained upon the table. The port 39 being set to admit pieces of the largest size being separated, evidently the bed must be several inches in thickness in order for a continuous flotant stratum of coal to flow freely above the tops of the separating partitions.

Means are provided for separately conveying away the different separated materials, and as embodied, chutes 107 and 109 are fixed at either side of the unit, and preferably are inclined forwardly and downwardly and discharge onto any suitable disposing means, such as a conveyor belt. Deflectors 110 and 111 may be employed to direct the forward end of the flow of separated lighter material into the chutes.

Means are provided by the invention for disposing of a material of intermediate specific gravity, such as the "bone" already referred to. As embodied, deflectors 112 and 113 may be provided, mounted upon side parts of the top of the air chamber. These direct this material of intermediate specific gravity into chutes 114 and 115, which likewise are preferably forwardly and downwardly inclined and discharge onto any suitable means for conveying the material away.

Further describing the operation of the mechanism, the rock or other heavier material will fill the passage or space beneath the plate 73 at the forward end of the unit, and from time to time the gate 80 will give way, or swing to the right, before the pressure of the rock. The rock will discharge into the chute, but as the pressure reduces, the gate 80 will again close, and the passage beneath the plate 73 will again fill up with rock. The result is, that there is an upward and backward air pressure from the forward end of the passage beneath the plate 73, and this will drive backwardly the particles or fragments of "bone" which may still be intermixed with the rock, and through the action of the plates 74 and the forward inclination and vibration of the mechanism, together with the air action, the "bone" will be discharged sidewise in front of the deflecting plates 112 and 113.

In accordance with one feature of the invention, separating partitions of different forms are interchangeably placed in the unit, and also any given form or shape of partitions is variably positionable. That is, the partitions are individually movable transversely to the unit, and either end of a partition is so movable with respect to the other end, if desired. Thus, the relative position of each partition with respect to the general axis of the unit may be varied, and also its relative position with respect to the other partitions. Also partitions of different shape may be interchanged one with the other. Straight separating partitions are shown in my copending application Ser. No. 574,034 filed July 10, 1922 and also different arrangements of such partitions along the unit and with respect to each other, and these could be utilized with the present structures and features of invention.

In the present embodied form (Fig. 5), the rear end of each of the separating partitions (Figs. 5 and 6) is provided with a hook-like member 120 consisting of a rod extending along and fastened to the end of the partition, and extending upwardly therefrom and then bent backwardly and downwardly. The wall members 55 and 56 have holes 121 formed in the tops thereof, to receive the ends 122 of the respective hooks 120.

At the forward end of the partition members (Figs. 5 and 7), the deflector 92 has formed on the forward side thereof a horizontally-extending, rearwardly-projecting flange 123, with a series of holes 124 formed therein. Headed pins 125 and 126 pass through these holes (Fig. 7) to hold this end of the separating partition in the desired position.

In Fig. 8 the separating partitions are shown extending forwardly to the rear end of the passage beneath the plates 73, although generally this extension will not be required.

In Fig. 9 the forward ends of the tops of the side-walls are curved upwardly and forwardly as shown at 127. This provides a heavier bed of the materials at this end and tends to thoroughly and completely separate any small remaining part which might possibly still be intermixed.

In Fig. 10 means are provided for regulating the force and action of the upwardly and rearwardly directed current of air at the front end of the unit. As embodied, a plate 128 lies upon the air pervious bottom 1, and preferably extends entirely across between the side-walls 70 and 71, and is slidable longitudinally along the bottom 1. For this purpose it is provided with a forwardly-extending handle 129. If desired, air apertures 130 may be formed in the slide, thereby diminishing but not cutting off the passage of air past the slide.

In Fig. 11 is shown a modified form of the member 73, wherein instead of one plate and a single passage, there are two horizontally disposed spaced-apart plates 131 and 132, with an air passage 133 formed therebetween and the passage 134 below plate 132. The rock or other heavy material passes out through the passage 134 in the manner already described.

In certain aspects of the invention, the form and the relative arrangement of the air-pervious bottom and of the separating partitions or walls may be varied to treat different kinds of intermixed divided materials, or for such materials in different physical states or conditions. In Fig. 12, the innermost partition walls 4ª are highest, the partition walls 5ª being lower, and the outermost walls 6ª being lowest. In Fig. 13 the relation and construction is just reversed, as will be seen from that figure.

In Figs. 14, 15 and 16 the bottom 1ᶜ is shown highest along the longitudinal central axis of the unit and inclined downwardly and outwardly therefrom to the sides of the unit. In Fig. 14 the separating partitions 4ᶜ, 5ᶜ and 6ᶜ are of uniform height, but their tops are downwardly and outwardly inclined by reason of the form of the bottom 1ᶜ. In Fig. 15 the relative heights of the separating partitions 4ᵈ, 5ᵈ and 6ᵈ are the same as already described for Fig. 12. In Fig. 16 the relation of the separating partitions 4ᵉ, 5ᵉ and 6ᵉ are the same as in Fig. 13, except as this relation is modified by the shape of the air-pervious bottom 1ᶜ.

In Fig. 17, the bottom 1ᵈ is shown of different degrees of perviousness, the part 135 between the separating partitions 4 being shown as most highly air-pervious, and the parts 136 between the separating partitions 4 and 5, at either side, being of a lesser degree of perviousness, and the parts 137 between the separating partitions 5 and 6, at either side, being of a still less degree of perviousness.

Referring now to the embodied form of means for variably inclining and positioning the separator units, and of the means or devices cooperating therewith for vibrating the units, as embodied, there is attached to the side walls 11 and 12 of the air chamber longitudinally-disposed rods 147 and 148, which rods are fastened thereto by suitable means, such as bolts 149 and 150. The ends of these rods extend outwardly beyond the ends of the air chamber, as shown in Figs. 1 and 18.

Cooperating with the foregoing is a non-vibratable, but longitudinally-inclinable, frame comprising side reaches 154 and 155, and end reaches 156 and 157, all connected together. The side reaches are pivotally supported, preferably at or near the middle point thereof, upon bolts 158 and 159, respectively, which bolts are anchored in corresponding pedestals or supports 160 and 161. Washers 162 and 163 are preferably interposed between the bolt heads and the pivotally supported beams.

Helical springs 164 are in compression between bar 147 and beam 154 and between bar 148 and beam 155. Pins 165 are fixed in the beams 154 and 155, and project upwardly through guiding-holes in the respective bars 147 and 148. These pins may be shouldered, as shown in Fig. 1, to act as a stop for the downward movement of the vibratable unit.

The cooperating form of vibrating means comprises a bail 170 fastened to the sidewalls of the unit in suitable manner, as by bolts 171 and 172. The bail is curved or bent inwardly and upwardly over the unit, and at its highest central point is provided a plate 170ª having a curved slot 170ᵇ therein. Slidably mounted on plate 170ª to slide therealong, is a contact 170ᶜ. A bolt 170ᵈ passes through the block and the slot, so that the block is variably positionable along the plate to correspond to variations in the inclination of the unit. Cooperating with the contact block 170ᶜ, in the embodied form, is a cam 174, fixed on a shaft 175. As the shaft rotates, the cam engages with the block 170ᶜ and depresses and then releases the unit, the springs 164 resiliently impelling the unit upwardly. The cam is preferably shaped to give the unit a relatively slow depression and then a sharp and sudden return upward movement.

In the embodied form of means for inclining the unit longitudinally, cooperating with the pivotal mounting already described, are one or more devices for holding the unit in the desired position. As embodied, a plurality of downwardly-depending legs 176 are pivotally connected, respectively, at 177 to the beams 154 and 155. These downwardly depending legs have bolt and slot connections 178, respectively, with corresponding pillars or pedestals 179. Thus, the unit may be readily tilted or inclined longitudinally to the exact desired position and locked therein.

From all the foregoing it will be understood that a process of separation and a mechanism adapted to, but not essential for, carrying out the process have been provided, realizing the objects of invention and advantages hereinbefore set forth, together with other objects and advantages. It will be understood also that changes may be made in the exact structure and process herein shown and described without departing from the principles of the invention and without sacrificing its chief advantages.

What I claim is:—

1. A mechanism for separating intermixed divided materials, comprising an inclined separating unit having an air pervious bottom in which a bed of materials of substantial depth is maintained, means for vibrating said unit, separating partitions of substantial height extending substantially longitudinally of the separating unit defining channels of substantial depth, means for forcing air upwardly through the bed of materials, whereby flotation, stratification and separation of the materials moving along said channels is effected, and means for variably positioning the said partitions in the unit.

2. A mechanism for separating intermixed divided materials, comprising an inclined separating unit having an air pervious bottom in which a bed of materials of substantial depth is maintained, means for vibrating said unit, separating partitions of substantial height, extending substantially longitudinally of the separating unit, defining channels of substantial depth, said partitions converging slightly toward the lower end of the unit, means for variably positioning said partitions in the unit, and means for forcing air upwardly through the bed of materials, whereby flotation, stratification and separation of the materials moving along said channels is effected.

3. A mechanism for separating intermixed divided materials, comprising a separating unit having an air pervious bottom, means for vibrating said unit, longitudinally extending partitions, varying in height, defining longitudinally extending channels of substantial depth, means for variably positioning said partitions in the unit, and means for forcing air upwardly through the air pervious bottom between the partitions, whereby flotation, stratification and separation of the materials in the bed are effected.

4. A mechanism for separating intermixed divided materials, comprising a separating unit having an air pervious bottom, means for vibrating said unit, longitudinally extending partitions of substantial height defining channels of substantial depth, means for variably positioning said partitions in the unit, and means for forcing air upwardly through the bottom of the unit between the several partitions and regulating the air currents between the partitions.

5. A mechanism for separating intermixed divided materials, comprising a separating unit having an air pervious bottom, means for vibrating said unit, longitudinally extending partitions defining channels of substantial depth, said partitions converging toward one end of the separating unit and being variously positionable, and means for forcing air upwardly through the air pervious bottom.

6. A mechanism for separating intermixed divided materials, comprising a separating unit having an air pervious bottom, means for vibrating said unit, longitudinally extending partitions defining channels of substantial depth, said partitions varying in height and converging toward one end of the separating unit and being variously positionable, and means for forcing air upwardly through the air pervious bottom.

7. A mechanism for separating intermixed divided materials comprising a longitudinally inclined separating unit having an air pervious bottom, means for vibrating said unit, longitudinally extending partitions carried by said unit, said partitions converging at the lower end of the unit and deflecting devices near the lower ends of the partitions and just above the upper edges thereof.

8. A mechanism for separating intermixed divided materials comprising a longitudinally inclined separating unit having an air pervious bottom, means for vibrating said unit, in a direction substantially perpendicular thereto, longitudinally extending partitions carried by said unit, said partitions converging at the lower end of the unit and deflecting devices near the lower ends of the partitions.

9. A process for separating intermixed divided materials varying relatively greatly in size and relatively little in their specific gravities, which comprises maintaining a bed of the intermixed materials of substantial depth on an air-pervious table, acting on the bed with lifting air currents and vibration to gradually stratify and separate the materials, progressing the lighter material in a substantially continuous, superior stratum to discharge, causing different sizes of heavy impurities to settle at different parts of the table beneath said superior stratum by passing air currents of different lifting force through different parts of the bed, deflecting and guiding the settled impurities transversely beneath the superposed lighter material, and discharging different sizes of heavy impurities from different parts of the table.

10. A process for separating intermixed divided materials varying relatively greatly in size and relatively little in their specific gravities, which comprises maintaining a bed of the intermixed materials of substantial depth on an air-pervious table, acting on the bed with lifting air currents and vibration to gradually stratify and separate the materials, progressing the lighter material, in a substantially continuous, superior stratum to discharge, causing the largest sizes of heavier material to settle first, and successively smaller sizes thereof to settle later at different parts of the table by gradating the lifting force of the air currents along the table and separately discharging the different size ranges of the settled materials from different parts of the table, by directing said different size ranges along separate paths to the place of discharge.

11. A process for separating intermixed divided materials varying relatively greatly in size and relatively little in their specific gravities, which comprises maintaining a bed of said materials of substantial depth upon a vibrating air-pervious table, acting on the bed with lifting air currents and mechanical vibration to gradually stratify the lighter material as a superior stratum while permitting the heavy materials to gradually settle to the table surface, progressing the lighter material and the settled heavier materials to different places of discharge by permitting the lighter materials to flow as a continuous superposed stratum toward a place of discharge while deflecting and guiding the settled heavy materials obliquely beneath the lighter material to discharge at a different place, and gradually and progressively gradating the lifting power of the air in the path of the lighter materials.

12. A process for separating intermixed divided materials varying relatively greatly in size and relatively little in their specific gravities which comprises maintaining a bed of said materials of substantial depth upon a vibrating air-pervious table, acting on the bed with lifting air currents and mechanical vibration to gradually stratify the lighter material as a superior stratum while permitting the heavy materials to gradually settle to the table surface, progressing the lighter material and the settled heavier materials to different places of discharge by permitting the lighter material to flow as a continuous superposed stratum toward a place of discharge while deflecting and guiding the settled heavy materials obliquely beneath the lighter material to discharge at a different place, and gradually and progressively decreasing the lifting power of the air in the path of the lighter materials.

13. A process for separating intermixed divided materials varying relatively greatly in size and relatively little in their specific gravities, which comprises maintaining a bed of said materials of substantial depth upon a vibrating air-pervious table, acting on the bed with lifting air currents and mechanical vibration to gradually stratify the lighter material as a superior stratum while permitting the heavy materials to gradually settle to the table surface, progressing the lighter material and the settled heavier materials to different places of discharge by permitting the lighter material to flow as a continuous superposed stratum toward a side edge of the table while deflecting and guiding the settled heavy materials forwardly along the table, and gradually and progressively decreasing the lifting power of the air in the path of the lighter materials.

14. A mechanism for separating intermixed divided materials wherein the particles vary relatively greatly in size but relatively little in their specific gravities, such as unsized coal, including in combination an air-pervious table, means for regulably feeding materials to the table, means for maintaining a continuous bed of materials of substantial depth upon the table, means for continuously progressing the bed along the table and gradually stratifying the bed in continuous superposed strata including devices for vibrating the table and for passing air currents upwardly through substantially all parts of the bed to loosen and stratify the particles, means for causing substantially all the particles of heavier material within one size range to settle in one part of the table and for causing particles of heavier material of different size ranges to settle in different parts of the table, and means for continuously progressing said settled particles of heavier material of different sizes along separate paths to a place of discharge.

15. A mechanism for separating intermixed divided materials wherein the particles vary relatively greatly in size but relatively little in their specific gravities, such as unsized coal, including in combination an air-pervious table, means for regulably feeding materials to the table, means for maintaining a continuous bed of materials of substantial depth upon the table, means for continuously progressing the bed along the table and gradually stratifying the bed in superposed strata including devices for vibrating the table and for passing air currents upwardly through substantially all parts of the bed to loosen and stratify the particles, means for first settling the largest particles of heavier material to the table surface and progressing said particles to discharge, means for thereafter settling the remaining smaller particles of heavier material and directing them along a different part of the table to discharge including separating partitions for confining and guiding said particles in their respective paths, and means for discharging the lighter material as a superior, substantially continuous and unbroken stratum.

16. The process of separating intermixed divided materials wherein the particles vary relatively greatly in size but relatively little in specific gravity, such as unsized coal, which comprises regulably feeding the materials to an air-pervious table and confining them on the table to maintain a bed of material of substantial depth thereon, progressing the bed of materials continuously along the table and gradually and progressively stratifying the particles in superposed strata including forcing air currents upwardly through the bed of materials and vibrating the table, causing the heavier particles to settle to the surface of the table in different areas substantially according to size, and separately progressing the different sizes of heavier material of discharge, while discharging the lighter material as a substantially continuous stratum.

17. The process of separating intermixed divided materials wherein the particles vary relatively greatly in size but relatively little in specific gravity, such as unsized coal, which comprises regulably feeding the materials to an air-pervious table and confining them on the table to maintain a bed of materials of substantial depth thereon, progressing the bed of materials continuously along the table and gradually and progressively stratifying the particles in continuous superposed strata including forcing air currents upwardly through the bed of materials and vibrating the table, causing the largest particles of heavier material to settle first, thereafter causing the smaller particles of heavier material to settle at different areas of the table and continuously progressing said sized and settled particles along different paths to discharge.

18. The process of separating intermixed divided materials wherein the particles vary relatively greatly in size but relatively little in specific gravity, such as unsized coal, which comprises regulably feeding the materials to an air-pervious table and confining them on the table to maintain a bed of materials of substantial depth thereon, progressing the bed of materials continuously along the table and gradually and progressively stratifying the particles in continuous superposed strata including forcing air currents upwardly through the bed of materials and vibrating the table, causing the largest particles of heavier material to settle first, thereafter causing the smaller particles of heavier material to settle at different areas of the table and continuously progressing said sized and settled particles along different paths to discharge, and progressing the lighter material as a continuous flotant stratum to discharge.

19. A mechanism for separating intermixed divided materials wherein the particles vary relatively greatly in size but relatively little in their specific gravities, such as unsized coal, including in combination an air-pervious table, means for regulably feeding the materials to the table, means for maintaining a continuous bed of materials of substantial depth upon the table, means for continuously progressing the bed along the table and gradually stratifying the bed in superposed strata including devices for vibrating the table and for passing air currents upwardly through substantially all parts of the bed to loosen and stratify the particles, means for concurrently classifying the heavier material according to size, means for separately progressing the different sizes of heavier materials to a place of discharge and means for discharging the lighter material in a substantially free and unrestricted stream.

20. The process of separating intermixed divided materials wherein the particles vary relatively greatly in size but relatively little in specific gravity, such as unsized coal, which comprises regulably feeding the materials to an air-pervious table and confining them on the table to maintain a bed of materials of substantial depth thereon, progressing the bed of materials continuously along the table and gradually and progressively stratifying the particles in superposed strata including forcing air currents upwardly through the bed of materials and vibrating the table, concurrently effecting a size classification of the settling heavier material, separately progressing the different sizes of settled heavier material to discharge, and separately discharging the lighter material as a substantially free and continuous stratum.

21. The process of purifying coal which comprises maintaining a continuous, traveling bed of substantial depth of raw coal which has not been subjected to close preliminary size classification, including in intermixture relatively large pieces and fine particles such as are present in coal as it comes from the mine, vibrating the bed, passing, lifting and loosening air currents simultaneously through substantially all parts of the unsized bed to loosen the intermixture and to float the lighter material, regulating the air action along the bed to control the settling of the heavier impurities substantially according to size including causing the larger pieces of heavier material to settle early in the travel of the bed and thereafter causing smaller and smaller particles thereof to settle at different areas of the bed, deflecting and guiding said different size ranges of settled heavier material transversely beneath the superposed lighter material and along separate side-by-side paths toward a discharge edge and discharging said different sizes of heavier material from the bed in a common stream, and progressing the lighter material as a continuous flotant stratum to discharge.

22. A mechanism for separating intermixed divided materials including in combination a vibratable, air-pervious table, means for maintaining thereon a continuous traveling bed of said materials of substantial depth in progression along the table, means for causing the lighter material to float and the heavier material to gradually and progressively settle to an inferior stratum, means for discharging the superior stratum of lighter material, means for impelling the settled heavier material along the table surface to discharge, and means for regulating the discharge of the heavier material including an orifice of variable size, means for passing a current of air through the orifice against the discharging heavier material, and means for regulating the amount of air in said current.

23. A mechanism for separating intermixed divided materials including in combination a reciprocable, air-pervious table, means for passing lifting and loosening air currents therethrough, a plurality of separating partitions thereon for directing settled heavier material to discharge, and means for controlling the discharge of heavier material from the table comprising an orifice beyond the ends of the separating partitions, means for varying the size of the orifice and means for directing a current of air through the orifice to oppose the material passing therethrough.

24. A mechanism for separating intermixed divided materials including in combination a reciprocable, air-pervious table, means for passing lifting and loosening air currents therethrough, a plurality of separating partitions thereon for directing settled heavier material to discharge and means for controlling the discharge of heavier material from the table comprising an orifice beyond the ends of the separating partitions, means for varying the size of the orifice, means for directing a current of air through the orifice to oppose the material passing therethrough, and means for varying the amount of air in said current.

In testimony whereof, I have signed my name to this specification.

KENNETH DAVIS.